(12) United States Patent
Mazza et al.

(10) Patent No.: US 11,676,044 B1
(45) Date of Patent: Jun. 13, 2023

(54) SYSTEMS AND METHODS FOR GENERATING A CHATBOT

(71) Applicant: ADA Support Inc., Toronto (CA)

(72) Inventors: Arnon Mazza, Givatayim (IL); Christos Melidis, Salonika (GR)

(73) Assignee: ADA SUPPORT INC., Toronto (CA)

( * ) Notice: Subject to any disclaimer, the term of this patent is extended or adjusted under 35 U.S.C. 154(b) by 0 days.

(21) Appl. No.: 17/889,186

(22) Filed: Aug. 16, 2022

(51) Int. Cl.
 *G06N 5/022* (2023.01)
 *G06N 5/043* (2023.01)
(52) U.S. Cl.
 CPC .............. *G06N 5/022* (2013.01); *G06N 5/043* (2013.01)
(58) Field of Classification Search
 None
 See application file for complete search history.

(56) References Cited

U.S. PATENT DOCUMENTS

| | | | | |
|---|---|---|---|---|
| 2020/0142996 | A1* | 5/2020 | Kondadadi | G06F 16/3334 |
| 2020/0142997 | A1* | 5/2020 | Kondadadi | G06F 16/35 |
| 2021/0383067 | A1* | 12/2021 | Reisswig | G06N 20/20 |

* cited by examiner

*Primary Examiner* — Alan Chen
(74) *Attorney, Agent, or Firm* — Lewis Roca Rothgerber Christie LLP (57) ABSTRACT

Systems and methods for generating a chatbot are disclosed. Source data is identified. A first chunk of the source data is also identified. A first machine learning model is executed for automatically generating a first candidate question associated with the first chunk. A determination is made as to whether the first candidate question satisfies a criterion. The first candidate question is output as training data for training the chatbot in response to the determination.

21 Claims, 9 Drawing Sheets

Contacting my driver

802 { Calling or messaging your driver is easy and safe. All numbers are masked in the Grab app for privacy. Please kindly note that our drivers may not answer their phones or reply to a text message promptly while they are focused on driving safely on the road, so do give your driver some time to get back to you.

▼ I want to call my driver

804 { At the bottom of your booking screen, tap on the Call icon to speak with your driver. The call will be connected via the internet, so please make sure that your phone has a stable connection.

Do not be alarmed if you see the call getting routed with a virtual number starting with +65 31xxxxxx (a masked number.) This means either you or the driver-partner has no internet connection.

▼ I want to message my driver

806 { At the bottom of your booking screen, tap on the Message icon and type in your message. Then, tap on the Send button.

You'll also be able to send images or voice messages to your assigned driver. We provided these options to help you communicate better if the driver cannot locate you.

▼ My driver is not responding

808 { If your driver is unresponsive or taking too long, you can cancel your booking and rebook a new ride without getting charged for the canceled ride. A cancellation fee may apply if the driver has already made efforts to reach your pickup point.

Do note that you'll not be able to rate your driver if your driver cancels on you. However, please be assured that Grab monitors driver cancellations vigilantly, and drivers will be held accountable for their cancellations.

SYSTEMS AND METHODS FOR GENERATING A CHATBOT

FIELD

One or more aspects of embodiments according to the present disclosure relate to chatbots, and more particularly to generating a chatbot using data collected from a source.

BACKGROUND

A chatbot may be used for automatically engaging in a conversation with a user. The conversation may be for responding to questions by the user. Setup and maintenance of the chatbot for understanding the questions and formulating appropriate responses, however, may be challenging for a chatbot builder.

The above information disclosed in this Background section is only for enhancement of understanding of the background of the present disclosure, and therefore, it may contain information that does not form prior art.

SUMMARY

Embodiments of the present disclosure are directed to a method for generating a chatbot. Source data is identified. A first chunk of the source data is also identified. A first machine learning model is executed for automatically generating a first candidate question associated with the first chunk. A determination is made as to whether the first candidate question satisfies a criterion. The first candidate question is output as training data for training the chatbot in response to the determination.

According to one embodiment, the determining whether the first candidate question satisfies a criterion includes: identifying a second chunk of the source data, wherein the second chunk includes the first chunk; and determining whether an answer to the first candidate question is found in the second chunk.

According to one embodiment, the method further includes providing the first candidate question and the second chunk to the first machine learning model, wherein the first machine learning model generates an output in response; comparing the output to the second chunk and generating a score; and in response to the score being above a threshold: identifying at least a portion of the second chunk as the answer; and associating the answer to the first candidate question for use as the training data.

According to one embodiment, the comparing includes: determining alignment of strings in the output to strings in the second chunk, wherein the score is indicative of a percentage of strings in the output that align with the strings in the second chunk.

According to one embodiment, the method further includes: in response to the score being below a threshold: employing a second machine learning model for assigning a classification score to the output; based on the classification score, identifying at least a portion of the second chunk as the answer; and associating the answer to the first candidate question for use as the training data.

According to one embodiment, the source data includes questions and answers to the questions.

According to one embodiment, the identifying includes identifying a visual cue associated with the first chunk.

According to one embodiment, the visual cue is at least one of font size, font type, font bold level, or data spacing.

According to one embodiment, the method further includes identifying a second chunk of the source data; executing the first machine learning model for generating a second candidate question associated with the second chunk; determining that the second candidate question is substantially similar to the first candidate question; and triggering an action in response to the determining.

According to one embodiment, the action is selecting one of the first chunk or the second chunk for associating with the first candidate question.

According to one embodiment, the action is merging the first chunk and the second chunk for associating with the first candidate question.

According to one embodiment, the method further includes identifying a change in the source data; and retraining the chatbot based on the change in the source data.

The present disclosure is also directed to a system for generating a chatbot. The system includes a processor and a memory. The memory includes instructions that, when executed by the processor, cause the processor to identify source data; identify a first chunk of the source data; execute a first machine learning model for automatically generating a first candidate question associated with the first chunk; determine whether the first candidate question satisfies a criterion; and output the first candidate question as training data for training the chatbot in response to determining whether the first candidate question satisfies the criterion.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

FIG. 8 is an example document that may be used for generating training question-answer pairs according to one embodiment;

DETAILED DESCRIPTION

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

A business may employ an automated answering system, a chat bot, a chat robot, a chatterbot, a dialog system, a conversational agent, and/or the like (collectively referred to as a chatbot) to interact with customers. Customers may use natural language to pose questions to the chatbot, and the chatbot may provide answers that are aimed to be responsive to the questions. The quality/responsiveness of the answers may depend on the training received by the chatbot. If the chatbot's training is insufficient to properly answer a user's question, it may lead to decreased customer satisfaction.

Training chatbots, however, can be an arduous task. In one example, a chatbot builder/administrator manually defines a set of questions and appropriate responses to the questions, and uses the question-answer pairs to train the chatbot. Manually generating the training questions, however, may require creativity or experience in the domain. For example, a user who wants to cancel his account may ask the question in many different ways, such as, for example, "How do I delete my account," "What steps do I take to remove my account," "Can I discard my account," or the like. The chatbot builder may need to manually come up with the different formulations of the same question, and train the chatbot to associate the questions with a single intent of "cancel account." Once the intent is identified, the chatbot may output a response associated with the recognized intent.

Even after the chatbot is trained, the chatbot administrator may need to update the chatbot from time to time to account for changes in company source data (e.g., company policy changes). For example, the chatbot's response to "How do I cancel my account," may need to be updated if the company adopts a new set of steps for canceling the account. The update may require, for example, retraining the chatbot based on the changes to the company's source data. It may be a challenge to manually retrain the chatbot when relevant company source data is updated.

In general terms, embodiments of the present disclosure are directed to systems and methods for generating and maintaining a chatbot. The chatbot according to embodiments of the present disclosure is trained to answer questions pertaining to contents of a given data source. In one embodiment, the setup of the chatbot may be facilitated by automatically suggesting questions and associated answers that may be used by a chatbot builder to train the chatbot. The suggestions may be based on analysis of company source data for which the chatbot is being built. The source may include, for example, a company's website (e.g., a Frequently Asked Questions (FAQ) page, help page, etc.), other documents generated for the company (e.g., text documents, image files, sound files, etc.), social media postings, and/or the like (collectively referenced as source data).

In one embodiment, the source data is segmented to generate one or more data blocks. The data blocks may then be provided to one or more machine learning models to generate questions for the input data blocks. In one embodiment, a large language model is leveraged to generate candidate questions given the source data.

In one embodiment, the generated questions are validated by checking whether the question maps back to an excerpt of the source data containing the input data block. The validation step may help improve the ratio of correctly generated questions. In this regard, not all questions suggested by the machine learning model may be relevant (e.g., in relation to the input data block). For example, a suggested question may be irrelevant because it cannot be answered by the input data block. A suggested question may also be irrelevant because, although the input data block may answer the question, there may be one or more other portions of the source data that may provide a better answer than the input data block.

In one embodiment, irrelevant questions that cannot be answered by an input context, which includes the data blocks, are filtered out. The one or more machine learning models, or a different classification model, may be invoked for the filtering. The machine learning models and/or classification model may also be invoked for identifying the portions of the input context that may provide a best answer to the candidate questions.

In some cases, there may be content overlap between the different documents in the source data that may result in the generating of duplicate questions. In one embodiment, a relevant (e.g., most relevant) answer block is selected from the different answer blocks. In one embodiment, similar answer blocks are combined/clustered into a merged answer block, and associated with the question.

It will be appreciated that the systems and methods for generating a chatbot according to the various embodiments expedite the training of chatbots by suggesting relevant question-answer pairs that may be used from the company's source data. The maintenance of the chatbots may also be expedited when there is a change in the source data, and the chatbot needs to be retrained in order to ensure that the answers provided by the chatbot reflect the change. The use of the company's source data for training may allow the chatbot to remain synchronized with the source data. In this regard, the changes in the source data may be tracked for updating the relevant answer blocks used for training the chatbot. In some embodiments, new question-answer pairs may be generated based on the changes in the source data. Changes made to the chatbot may be logged for avoiding redoing a modification that may have already been performed in a previous iteration by a human chatbot builder.

Figure 1:
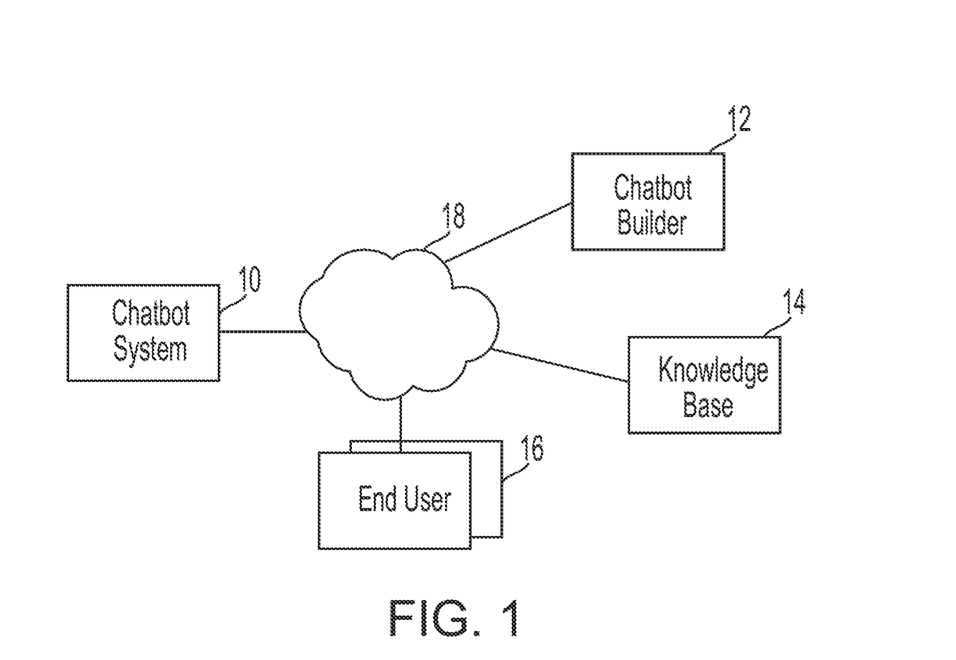
FIG. 1 is a block diagram of a network environment according to one embodiment.

FIG. 1 is a block diagram of a network environment including a chatbot system 10, a chatbot builder 12, a knowledge base 14, and an end user device 16. The chatbot system 10, chatbot builder 12, knowledge base 14, and end user device 16 may be coupled to one another over a data communications network 18. The data communications network 16 may a local area network, private wide area network, and/or public Internet.

In one embodiment, the chatbot system 10 is configured to handle interactions with the end user device 16. The chatbot system 10 may be configured to handle interactions on behalf of a particular business or enterprise, or on behalf of multiple businesses or enterprises. For example, a separate instance of a chatbot system 10 may be provided for each separate enterprise for handling interactions of that enterprise.

The end user device 16 may be a desktop, laptop, and/or any other computing device conventional in the art. A customer, potential customer, or other end user (collectively referenced as an end user) desiring to receive services from the enterprise may initiate communications to the chatbot system 10 using the end user device 16. For example, the end user may formulate a query, and transmit the query to the chatbot system 10 as a chat message, text message, social media message, and/or the like. The chatbot system 10 may process the query and determine a user intent. One or more machine learning models may be invoked for predicting the user intent Once the intent is determined, the chatbot may output an answer in response to the query. The one or more machine learning models, and software and hardware for interfacing with the end user devices 16, may generally be referred to as a chatbot. In one embodiment, the chatbot is an FAQ chatbot trained to answer questions that may typically appear in an FAQ page of a company's website, although embodiments are not limited thereto.

In one embodiment, the chatbot builder 12 may include a computing system for access by a chatbot administrator for generating (e.g., configuring and training) and maintaining the chatbot system 10 for a particular enterprise. The computing system may be a desktop computer, laptop computer, network server, mobile device, embedded computer, and/or the like. The chatbot builder 12 may be accessed by, for example, the chatbot administrator to train one or more machine learning models (referred to as inference models) of the chatbot system 10.

In one embodiment, the chatbot system 10 provides recommendations of training data that may be used by the chatbot builder 12 to train the inference models used by the chatbot to respond to user queries. In this regard, the chatbot system 10 may analyze the knowledge base 14 for automatically identifying question and answer pairs that may be used as the training data. The knowledge base 14 may include any source of information for the particular enterprise that is serviced by the chatbot system 10. For example, the knowledge base 14 may include the enterprise's website, database, social media sites, and/or any other online repository of source data for the enterprise. The automatic recommendation of question and answer pairs that may be used as the training data may help expedite the training of the chatbot, which may otherwise be a time-consuming process.

In some embodiments, instead of outputting the question and answer pairs as recommendations for training the chatbot, the chatbot system 10 may automatically engage in the training process, and present to the chatbot builder an initially trained chatbot. This may result in a chatbot that is operational and ready to use without much effort from the chatbot administrator. The chatbot may be retrained and refined, as needed, based on feedback on the accuracy of the responses provided by the chatbot as the chatbot is used in practice. A chatbot builder may also assess the quality of the questions, and modify or refine the questions based on his or her knowledge.

Figure 2:
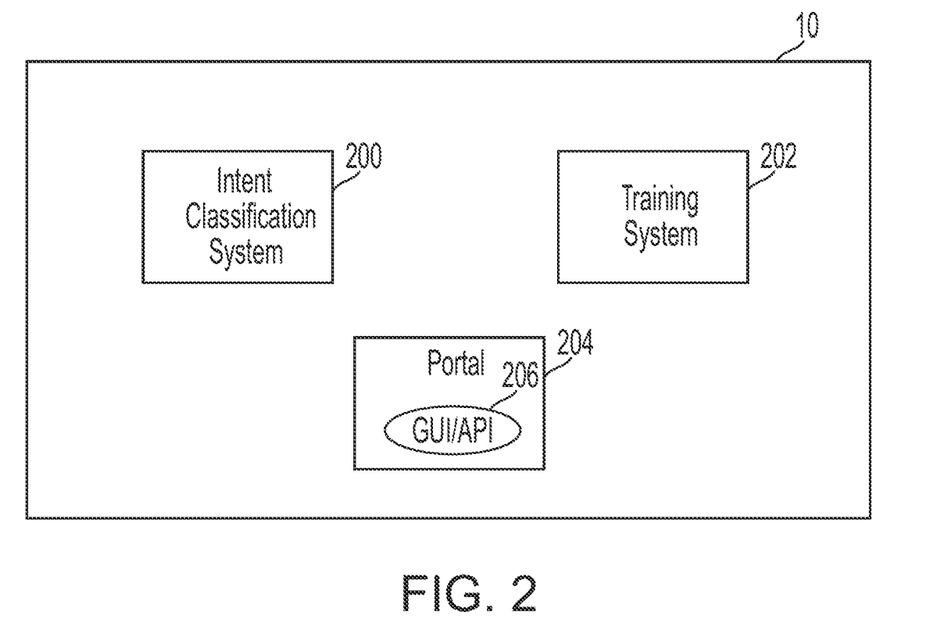
FIG. 2 is a block diagram of a chatbot system 10 according to one embodiment.

FIG. 2 is a block diagram of the chatbot system 10 according to one embodiment. The chatbot system 10 may include, without limitation, an intent classification system 200, a training system 202, and an administrator portal 204. The intent classification system 200 may include one or more machine learning models (referred to as inference models) that are trained to identify a user intent based on a user query. For example, the intent classification system 200 may receive queries that may be found in a company's frequently asked questions (FAQ) page, although embodiments are not limited thereto. Such questions may include, for example, "How do I cancel my account," "How do I make a return," "How do I make a payment," "How do I check my order status," or the like. The intent classification system 200 may receive the query and predict a user intent associated with the query. In the given example queries, the associated intents may respectively be "cancel account," "make returns," "make payments," and "order status."

The inference models used by the intent classification system 200 may include, for example, deep neural networks, shallow neural networks, and the like. The neural network(s) may have an input layer, one or more hidden layers, and an output layer. One or more of the neural networks may generate a set of context-aware embeddings (also referred to as features) from the user query. The embeddings may be word and/or sentence embeddings that represent one or more words of the user query as numerical vectors that encode the semantic meaning of the query. In this regard, the embeddings may also be referred to as semantic representations. In one example, the embeddings may be represented as a vector including values representing various characteristics of the word(s) in the query, such as, for example, whether the word(s) is a noun, verb, adverb, adjective, etc., the words that are used before and after each word, and/or the like.

In one embodiment, the embeddings may be generated by a language model that has been fine-tuned in a multi-task setting. The language model may be a Bidirectional Encoder Representations and Transformers (BERT) model having one or more embedding layers, each layer generating an embedding based on the query. The model may be fine-tuned by adjusting values of one or more learnable parameters of the language model for a particular task.

In one embodiment, the intent classification system 200 is configured to extract embedding features from the embeddings. The embedding features may be extracted, for example, from a subset of the embedding layers of the language model. The intent classification system 200 may use the extracted embedding features to predict a user intent. The predicted user intent may be used to identify an answer to the user query, for being returned to the requesting user.

In one embodiment, the training system 202 is configured to train one or more machine learning models of the intent classification system 200. In one embodiment, some or all components of the training system 202 may be incorporated into the intent classification system 200. The training system 202 may train or retrain (collectively referenced as "train") the one or more machine learning models using training data.

In one embodiment, the training system 202 is configured to collect and analyze source data from the knowledge base 14, and automatically generate the training data for training the inference models. The source data may include text, images, audio, and/or the like.

In one embodiment, the training system 202 invokes a pretrained language model for generating candidate questions based on the analysis of the source data. The pretrained language model may include, for example, a generative language model such as, for example, Generative Pretrained Transformer 3 (GPT-3), that has been trained to generate new intents/answers based on existing intents/answers. In one embodiment, one or more data blocks or segments of the source data are provided to the language model as input, and the language model is instructed to generate candidate questions given the input data.

The candidate questions generated by the language model may not always be relevant to the input block of source data. That is, because the language model may be one that has been trained using a vast amount of world knowledge, the generated question may not be one that can be answered, or is one that is best answered, by the input block of source data.

In one embodiment, the training system 202 attempts to validate the generated questions for determining whether the input block of source data appropriately answers the question. The question may be discarded, or a different portion of the source data may be identified to answer the question, based on the results of the validation.

In some cases, there may be content overlap in the source data that may cause duplicate questions to be generated by the language model. In one embodiment, the training system 202 identifies the duplicate questions, and selects one of the overlapping portions of the source data, as the answer. The one of the overlapping portions may be selected based on sematic similarity to the question. In one embodiment, the overlapping portions may be concatenated, and the concatenated portion provided to the language model for identifying a section of the concatenated portion that best answers the question. The identified section may then be kept as the answer.

In some instances, there may be answer blocks (clusters) that may overlap. For example, a first answer block may be associated with a first question Q1, and a second answer block may be associated with a second question Q2, while the first and/or second answer block may be associated with a third question. In some embodiments, the first and second answer blocks may be merged if the questions (e.g., Q1 and Q2) are deemed to be sufficiently similar. If the answer blocks are merged, the merged answer block may then be associated with Q1, Q2, and Q3.

In some embodiments, the training system 202 is configured to monitor the knowledge base 14 for changes in the source data. When a change is detected, the training system 202 may provide the updated source data (including context surrounding the source data), to the language model, for generating one or more training questions. The updated question-answer pair may then be used for retraining the inference models.

In one embodiment, the administrator portal 204 is a server that serves a GUI or an application programming interface (API) (collectively referenced as GUI) 206 that may be accessed by the chatbot builder 12. The access of the portal 204 may be via the Internet using, for example, a web browser or the API.

In one embodiment, the GUI 206 may cause display of the question-answer pairs recommended by the training system 202. The chatbot administrator may select one or more of the question-answer pairs to train the inference models of the intent classification system 200.

Figure 3:
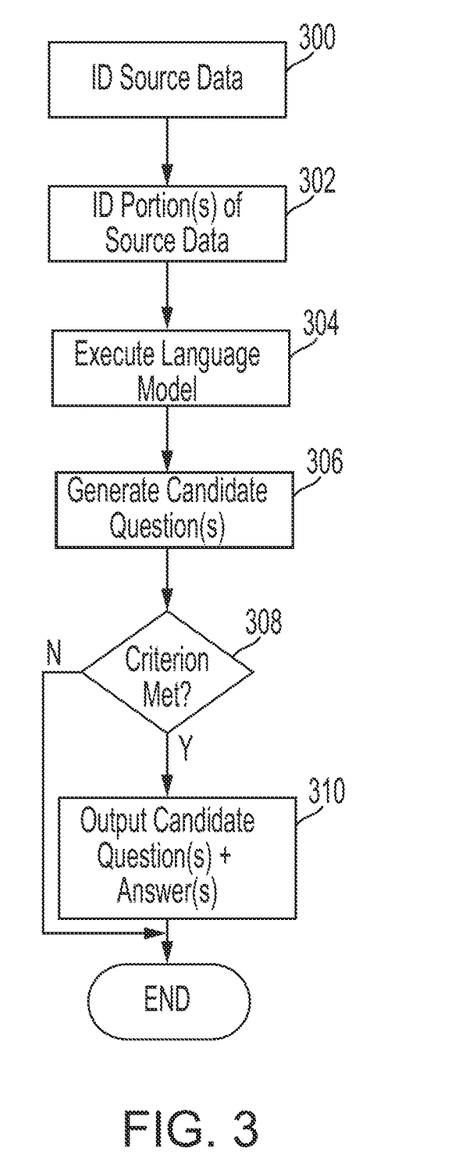
FIG. 3 is a flow diagram of a process for automatically generating training questions for a chatbot, according to one embodiment.

FIG. 3 is a flow diagram of a process for automatically generating training questions for a chatbot, according to one embodiment. The process starts, and in act 300, the training system 202 identifies source data from the knowledge base 14. The training system 202 may search the knowledge base 14 for the relevant source data to be used to generate the training questions, and/or the source data (or links to the source data) may be provided to the training system by the chatbot builder 12 via the administrator portal 204.

In act 302, the training system 202 analyzes the source data for identifying segments, blocks, or partitions (collectively referenced as chunks) of the data. The identified chunks may be blocks of text, images, sounds, and/or the like. Using a text document as an example, the training system 202 may parse the text document and identify one or more groupings of the text using, for example, visual cues. The visual cues may be, for example, a font type, a font size, font bold level, amount of spacing (e.g., between words, sentences, or paragraphs), special characters (e.g., bullet points, Roman numerals, etc.), weight (e.g., a combination of the font size and font bold level), and/or the like. For example, an identified block may be a paragraph, or text under a heading or subheading.

For an image document, one or more different images may be identified based on, for example, an image classification algorithm that labels different portions of the images into one of a number of predefined classes. One or more of the identified images may be a chunk identified in act 302.

In act 304, the training system 202 executes a language model for generating a candidate question. The language model may be, for example, a generative language model such as GPT-3, although embodiments are not limited thereto. Using GPT-3 as an example, the training system 202 may provide a prompt to the language model to generate an output. The prompt may include, for example, a company name, text block (e.g., the identified chunk), title of the identified chunk (e.g., a heading or subheading of the chunk or an ancestor chunk if the chunk has no direct title), and a description of a task that the language model is to undertake. For example, for company "XYZ," and title "How to Get a Refund," the task provided to the language model may be to generate X number of questions that an XYZ customer may ask about how to get a refund, that can be answered by the identified chunk.

In act 306, the language model generates the prompted X number of questions based on the identified chunk.

In act 308, a determination is made as to whether the generated questions meet a criterion for being recommended as training questions for training the inference model(s) of the intent classification system 200. If the answer is YES, one or more of the questions that meet the criterion may be output, in act 310, as recommended training questions. In one embodiment, the recommended training questions are paired with corresponding answers, and the question-answer pairs are provided as the recommended training data. The answers may comprise all or a portion of the chunk data that was used by the language model to generate the questions.

If a generated candidate question does not meet the criterion, the candidate question may be deleted or ignored, and not recommended as a candidate training question.

Figure 4:
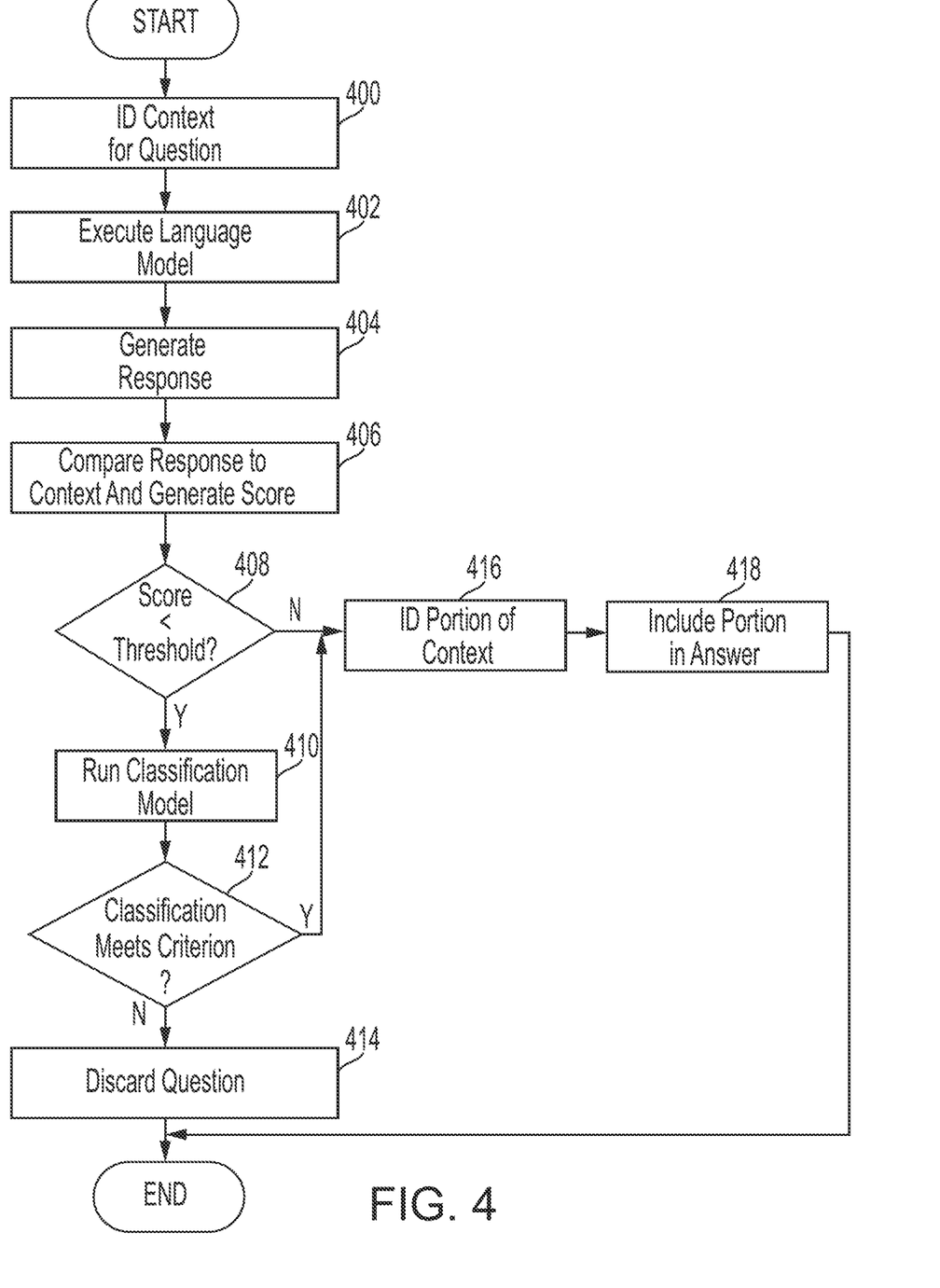
FIG. 4 is a flow diagram of a process for determining whether a candidate question satisfies a criterion for being recommended as a training question for training the inference model(s), according to one embodiment.

FIG. 4 is a flow diagram of a process for determining whether a candidate question satisfies a criterion for being recommended as a training question for training the inference model(s), according to one embodiment. The process, which may also be referred to as a validation process, may be executed for one or more of the generated candidate questions, concurrently or in series.

The process starts, and in act 400, the training system 202 identifies a context for the candidate question that is to be validated. In one embodiment, the context includes the chunk of the source data that was used to generate the candidate question(s), along with other source data surrounding the chunk. For example, the context may include, in addition to the identified chunk, a portion of the source data that is a level above the chunk. For example, a document may hierarchically be organized as pages that include paragraphs, where the paragraphs include sentences, and the sentences include words. If a paragraph of such a document is used as the chunk for generating a candidate training question, a level above the paragraph may be a page. Thus, the page containing the chunk may be used as the context for the validation process. In another example, if a document is organized into sections and subsections, and a particular subsection is used as the chunk, the entire section may be used as the context for the validation process.

In act 402, the training system 202 executes a language model for generating a response to the candidate question, using the input context. The language model may be the same or different from the language model that is invoked to generate the candidate question. In one embodiment, the language model is a generative language model such as GPT-3, although embodiments are not limited thereto. Using GPT-3 as an example, the training system 202 may provide, as input, the candidate question along with the generated context, and instruct the model to output a response using an excerpt from the input context.

The model outputs the response in act 404.

In act 406, the training system 202 compares the response to the input context and generates a score. The score may be, for example, an alignment score that indicates how well the response aligns with the input context. For example, a string alignment algorithm may be executed to determine how well the strings in the response align with strings in the context.

In act 408, the generated score is compared against a threshold alignment value. For example, a threshold alignment value of 70% may be used to determine whether the response sufficiently aligns with the input context. If the score is less than the threshold alignment value, further evaluation may be conducted for determining the reason for the misalignment. In some cases, the lack of alignment may be because the language model is unable to answer the question using an excerpt from the input context. In this case, the language model may generate a response from its gained knowledge or history, resulting in the mismatch between the generated response and the input context. In other cases, the misalignment may be because although the substance of the response equals the substance of the input context, the response may be rephrased (e.g., may use different words, may use different synonyms, the order of the words may differ, etc.), causing the response to fail to meet an alignment threshold.

In one embodiment, the further evaluation is conducted by running a classification model in act 410. The classification model may be a machine learning model that has been trained to predict a label (or class) based on input data. For example, the classification model may be trained to answer "1" (yes) if an input question can be answered by an input context, or "0" (no) if the input question cannot be answered by the input context.

In one embodiment, the classification model is GPT-3, although embodiments are not limited thereto. Using GPT-3 as an example, the training system 202 may provide to GPT-3 the candidate question and the input context, and prompt the model to output a label indicative of whether the question can be answered by the response (e.g., 1 or 0).

In one embodiment, the classification model is one that is configured to return a classification score between 0 and 1. The closer the classification score is to 1, the more certain that the candidate question can be answered by the response. The classification score may also be interpreted as a confidence value. In one embodiment, the classification model is trained using question-answer pairs that results in a 1 label, as well as with question-answer pairs that result in a 0.

In act 412, a determination is made as to whether the classification results satisfy a criterion. For example, the criterion may be satisfied if the output classification label is 1. In embodiments whether the output is a classification score between 0 and 1, the alignment score from act 406 may be combined with the classification score (e.g., to generate an average score), and the combined score may be compared against an aggregate threshold value. The criterion may be deemed to have been satisfied if the combined score exceeds the aggregate threshold value.

If the criterion is not satisfied, the candidate question is discarded, in act 414, and not output as a recommended training question.

If the criterion is satisfied, the training system 202 identifies, in act 416, a portion of the input context that achieved optimal alignment with the answer generated in act 404.

In act 418, the training system 202 includes the identified portion of the input context into the answer that is to be associated with the recommended training question. For example, if one or more sentences of a paragraph of the input context are selected as the portion that achieved optimal alignment, the training system 202 may return the entire paragraph that contains the one or more sentences as the answer block for the recommended training question.

In one embodiment, the training system 202 engages in post-processing of the answer blocks that are to be associated with the recommended training questions. For example, content overlap between different source documents may result in duplicate questions for separate answer blocks. In one embodiment, the training system 202 identifies the duplicate questions for separate suggested answers, and identifies an optimal answer from the plurality of separate suggested answers.

Figure 5:
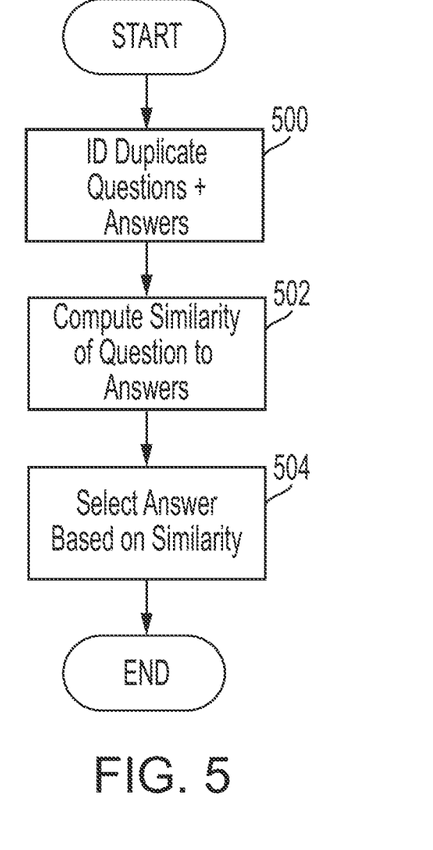
FIG. 5 is a block diagram of a first type of answer block post-processing according to one embodiment.

FIG. 5 is a block diagram of a first type of answer block post-processing according to one embodiment. The process starts, and in act 500, the training system 202 identifies duplicate questions for separate suggested answers (e.g., N answer blocks).

In act 502, the training system 202 determines semantic similarity of the question to each of the N answer blocks. For example, the training system 202 may generate vector embeddings (also referred to as features) for the duplicate question, and vector embeddings for each of the N answer blocks. The embeddings may be word and/or sentence embeddings that represent one or more words of an input (e.g., the question or answer) as numerical vectors that encode the semantic meaning of the input. In this regard, the embeddings may also be referred to as semantic representations. In one example, the embeddings may be represented as a vector including values representing various characteristics of the word(s) in the input, such as, for example, whether the word(s) is a noun, verb, adverb, adjective, etc., the words that are used before and after each word, and/or the like.

In one embodiment, in computing the similarity of the question to each of the N answer blocks, the training system 202 computes a cosine similarity distance between the embeddings generated for the question, and the embeddings generated for each of the N answer blocks.

In act 504, the training system 202 selects an answer block with the highest semantic similarity based on the computed cosine similarity distance. The selected answer block may be output as the recommended answer block for the duplicate question, and the remaining answer blocks may be discarded and/or ignored.

Figure 6:
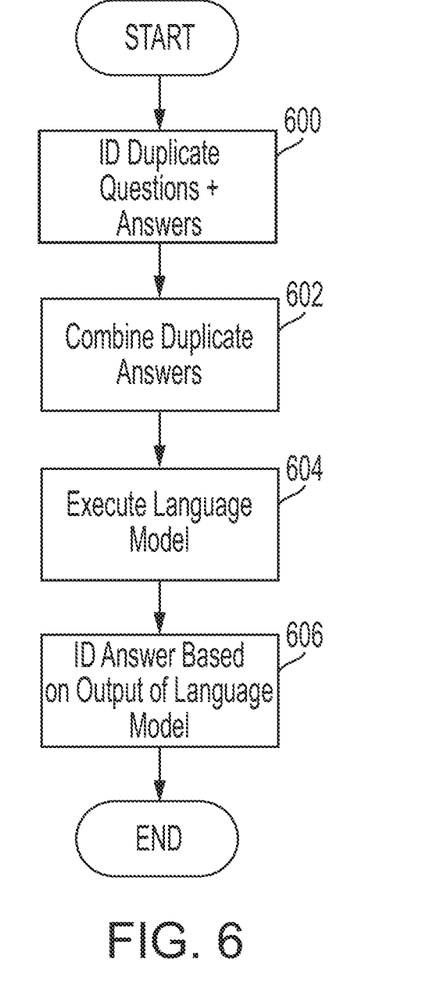
FIG. 6 is a block diagram of a second type of answer block post-processing according to one embodiment.

FIG. 6 is a block diagram of a second type of answer block post-processing according to one embodiment. The process starts, and in act 600, the training system 202 identifies duplicate questions for separate suggested answers (e.g., N answer blocks).

In act 602, the training system 202 combines the N answer blocks to form a combined answer. For example, the training system 202 may concatenate portions of the source data that contains the N answer blocks to form the combined answer.

In act 604, the training system 202 executes a language model using the combined answer and the associated question, as inputs. The language model may be, for example, the language model used in act 402 (FIG. 4) for validating a candidate question. Similar to act 402, the language model may be instructed to output a response using an excerpt from the combined answer.

In act 606, the training system 202 identifies one of the N answer blocks based on the response output by the language model. For example, the training system 202 may identify a portion of the combined answer that results in optimal alignment with the response that is output by the language model in act 604. The answer block that contains the identified portion may then be output as the recommended answer block for the question, and the remaining answer blocks may be discarded and/or ignored.

In one embodiment, the post-processing of the answer blocks may include merging similar answer blocks with overlapping content. For example, a first answer block may be a best answer for a first set of questions (Q1), a second answer block may be a best answer for a second set of questions (Q2), and the first and/or second answer blocks may be best answers for a third set of questions (Q3). The first and second answer blocks may thus have overlapping content for responding to Q3.

In one embodiment, the training system 202 merges the first and second answer blocks based on similarity computations that indicate that Q1 is substantially similar to Q2. Once the answer blocks are merged, the combined answer blocks may be used to respond to Q1 and Q2, in addition to Q3.

Figure 7:
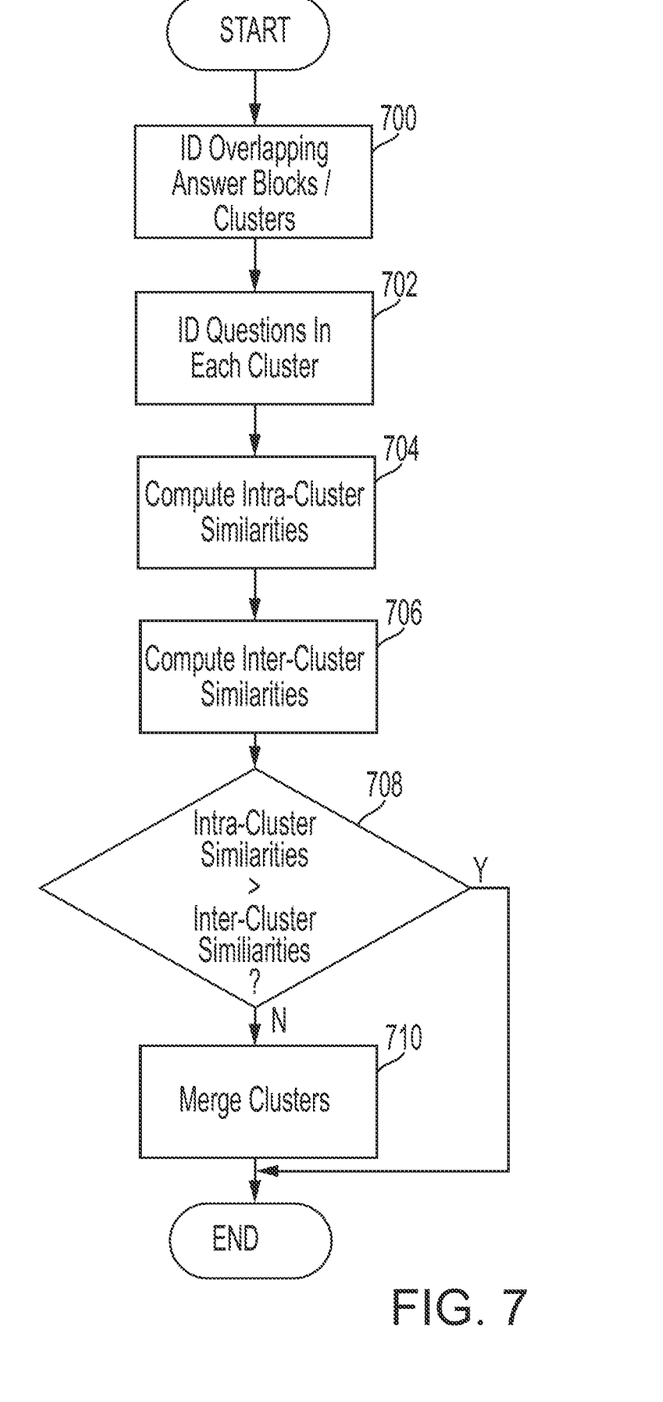
FIG. 7 is a flow diagram of a process for merging similar answer blocks according to one embodiment.

FIG. 7 is a flow diagram of a process for merging similar answer blocks (also referred to as clusters) according to one embodiment. The process starts, and in act 700, the training system 202 identifies overlapping clusters where a first cluster C1 may be associated with questions in a first set Q1, a second cluster C2 may be associated with questions in a second set Q2, and the first cluster C1 and/or the second cluster C2 may be associated with questions in a third set Q3. The first and second clusters may provide overlapping content (e.g., answers) with respect to the questions in the third set Q3.

In act 702, the questions in each of sets Q1 and Q2 are identified, and similarity computations are performed for determining similarity of the questions in Q1 to the questions in Q2. In this regard, the training system 202 computes intra-cluster similarities in act 704, and inter-cluster similarities in act 706.

In computing intra-cluster similarities for the first cluster C1, the training system 202 may generate vector embeddings for the questions in Q1, and vector embeddings for the answer block associated with the first cluster C1. The vector embeddings may be used to determine semantic similarities between the questions and the answer block. The semantic similarities may be determined by computing cosine similarity distances, although embodiments are not limited thereto.

In a similar manner, the training system 202 may also determine semantic similarities between the questions in Q2, and the answer block associated with the second cluster C2.

In computing the inter-cluster distance between the first and second overlapping clusters, the training system 202 may determine semantic similarities between the questions in Q1, and the answer block associated with the second cluster C2. The training system 202 may further determine semantic similarities between the questions in Q2, and the answer block associated with the first cluster C1.

In act 708, a determination is made as to whether the intra-cluster similarities are higher than the inter-cluster similarities. For example, a rank-sum test may be applied to measure the statistical significance p at which the intra-cluster similarities are higher than the inter-cluster similarities.

In this regard, the significance p-value measures the significance of the result of the similarity comparison. The smaller the p-value, the higher the significance. Therefore, if the p-value is below the significance level (e.g., $p<0.01$), the elements within each of the clusters are deemed to be more similar to each other than they are similar to the elements of the other cluster, and the clusters are not merged. If, on the other hand, the p-value is above the significance level, the clusters are merged in act 710.

FIG. 8 is an example document (e.g., web page) 800 that may be used for generating training question-answer pairs according to one embodiment. The training system 202 may analyze the document 800 and partition the document into four chunks 802-808. For example, the chunks may be determined based on identifying section headings 810*a*-810*d* that have a larger font size than the remaining text.

In the example document 800, the following question-answer pairs may be recommended by the training system 202 based on the execution of the processes of FIGS. 3 and 4:

Q1: How can I call my driver?
A1: Answer in Chunk 804
Q2: How do I know my driver's number?
A2: Answer in Chunks 802 and 804
Q3: How can I message my driver?
A3: Answer in Chunk 806
Q4: Can I send an image to the driver?
A4: Answer in Chunk 806
Q5: How can I contact my driver?
A5: Answer in Chunks 804 and 806
Q6: What if my driver doesn't answer their phone?
A6: Answer in Chunk 808
Q7: Can I cancel my booking if my driver is unresponsive or taking too long?
A7: Answer in Chunk 808
Q8: How does <Company> handle driver cancellations?
A8: Answer in Chunk 808

For example, in generating Q5, the language model may receive as input the paragraphs in chunk 804 or chunk 806. When the validation process of FIG. 4 is executed, the training system 202 may determine that the best answer for Q5 is a combination of chunks 804 and 806, and output both of the paragraphs as the answer.

During the answer block post-processing of FIG. 7, the training system 202 may analyze chunks 804 and 806 with overlapping content, and determine whether the chunks (e.g., clusters) should be merged. The chunks may be merged if the questions generated for the chunks (e.g., Q1 and Q3) are deemed to be similar as discussed above with respect to FIG. 7. Although only two questions are used in the example of FIG. 8 for simplicity purposes, a person of skill in the art should appreciate that each chunk may be associated with multiple questions. If the chunks are merged, the questions Q1, Q3, and Q5 generated for chunk 804, chunk 806, and combined chunks 804 and 806, may be answered by a single answer block A5 representing the combined chunks 804 and 806.

In one embodiment, the training system 202 is configured to monitor for changes in the source data, and retrain the chatbot in order to ensure that the answers provided by the chatbot reflect the change. In this manner, the chatbot remains synchronized with the source data, and the answers provided by the chatbot are consistent with answers provided by the source data.

Figure 9:
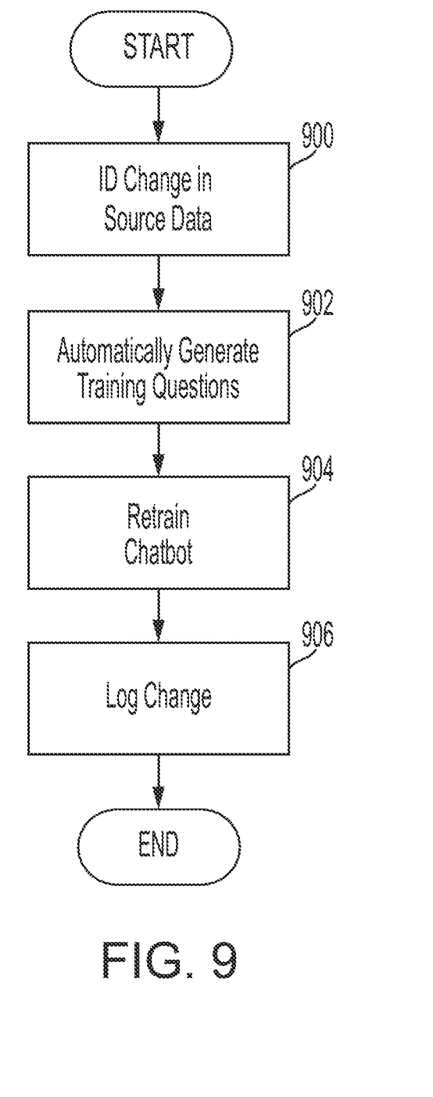
FIG. 9 is a flow diagram of a process for retraining the chatbot according to one embodiment.

FIG. 9 is a flow diagram of a process for retraining the chatbot according to one embodiment. The process starts, and in block 900, the training system 202 monitors and identifies change in the source data. The change may be for example, a change of a response to be provided to a frequently asked question. The change may be due to a change in company policy. For example, a return policy of the company may change, necessitating a change to the response on how to make returns.

In act 902, the training system 202 engages in a process of automatically generating training questions based on the changed source data. In this regard, the process of FIG. 3 may be executed based on the changed source data. For example, the training system 202 may identify portions of the source data that have been changed, and engage in the generating of one or more training questions and associated answers for the changed portion. In some embodiments, both changed and unchanged portions of the source data may be used for generating the training questions and associated answers. For example, if the change occurs in a particular paragraph of a page of a document, the entire page may be used as the source data for generating the training-answer pairs.

In act 904, the training system 202 may use the training questions and associated answers for re-training the inference models of the chatbot system 10.

In act 906, the training system 202 may record the change of the chatbot system 10 in a log. The log may include, for example, a timestamp in which the change was made. Changes made to the chatbot may also be recorded in the log for avoiding redoing a modification that may have already have been performed in a previous iteration.

It will be appreciated that the systems and methods for generating a chatbot according to the various embodiments expedite the training of chatbots by suggesting relevant question-answer pairs from the company's source data. The maintenance of the chatbots may also be expedited when there is a change in the source data, as updated question-answer pairs may be suggested based on the change.

In the various embodiments, the terms "interaction" and "communication" are used interchangeably, and generally refer to any real-time and non-real time interaction using, for example, chats, text messages, social media messages, and/or the like.

In one embodiment one or more of the systems, servers, devices, controllers, engines, and/or modules (collectively referred to as systems) in the afore-described figures are implemented via hardware or firmware (e.g. ASIC) as will be appreciated by a person of skill in the art. The one or more of the systems, servers, devices, controllers, engines, and/or modules may also be a software process or thread, running on one or more processors, in one or more computing devices.

Figure 10:
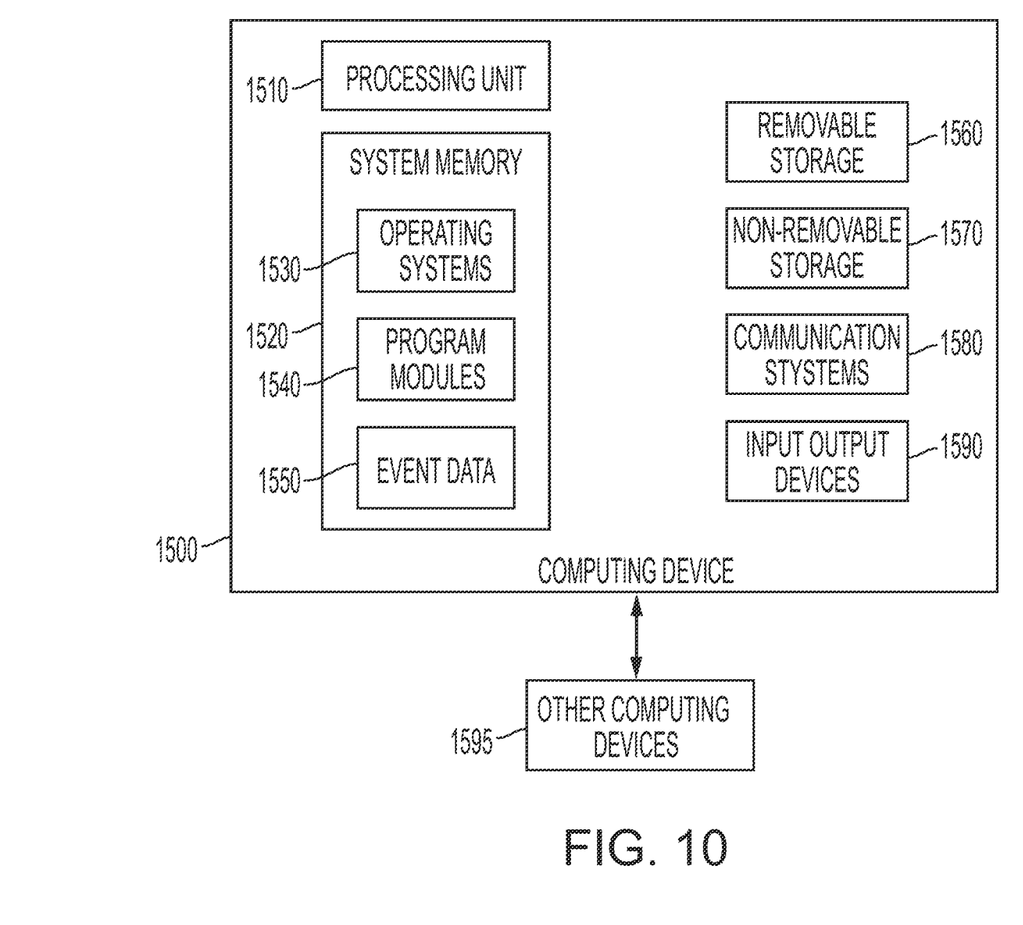
FIG. 10 is a block diagram of a computing device 1500 according to one embodiment.

FIG. 10 is a block diagram of a computing device 1500 according to one embodiment. The computing device 1500 may include at least one processing unit (processor) 1510 and a system memory 1520. The system memory 1520 may include, but is not limited to, volatile storage (e.g., random access memory), non-volatile storage (e.g., read-only memory), flash memory, or any combination of such memories. The system memory 1520 may also include an operating system 1530 that controls the operation of the computing device 1500 and one or more program modules 1540 including computer program instructions. A number of different program modules and data files may be stored in the system memory 1520. While executing on the processing unit 1510, the program modules 1540 may perform the various processes described above.

The computing device 1500 may also have additional features or functionality. For example, the computing device 1500 may include additional data storage devices (e.g., removable and/or non-removable storage devices) such as, for example, magnetic disks, optical disks, or tape. These additional storage devices are labeled as a removable storage 1560 and a non-removable storage 1570.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In some embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

According to one embodiment, the computing device 1500 is configured to communicate with other computing devices over a network interface in a network environment. The network environment may be a virtual network environment where the various components of the network are virtualized. For example, the chatbot systems 10, 1458 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

In regards to the processes in the flow diagrams of FIGS. 3-7, it should be understood that the sequence of steps of the processes are not fixed, but can be modified, changed in order, performed differently, performed sequentially, concurrently, or simultaneously, or altered into any desired sequence, as recognized by a person of skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure." Also, the term "exemplary" is intended to refer to an example or illustration. As used herein, the terms "use," "using," and "used" may be considered synonymous with the terms "utilize," "utilizing," and "utilized," respectively.

Although exemplary embodiments of chatbot systems and methods for training and using the chatbot systems have been specifically described and illustrated herein, many modifications and variations will be apparent to those skilled in the art. Accordingly, it is to be understood that the chatbot systems and methods for training and using the chatbot systems constructed according to principles of this disclosure may be embodied other than as specifically described herein. The disclosure is also defined in the following claims, and equivalents thereof.

What is claimed is:

1. A method for generating a chatbot comprising:
   identifying source data;
   identifying a first chunk of the source data, wherein the first chunk contains a first response to a user query;
   identifying an instruction, wherein the instruction includes a description of an output to be generated;
   providing the instruction and the first chunk as inputs to a first machine learning model;
   generating by the first machine learning model, as the output, based on the instruction and the first chunk, a prediction of a first candidate question to be answered by the first chunk;
   determining whether the first candidate question satisfies a criterion; and
   outputting the first candidate question as training data for training the chatbot in response to the determining.

2. The method of claim 1, wherein the determining whether the first candidate question satisfies a criterion includes:
   identifying a second chunk of the source data, wherein the second chunk includes the first chunk, wherein the second chunk provides additional data as context for the first chunk; and
   determining whether an answer to the first candidate question is found in the second chunk.

3. The method of claim 2 further comprising:
   providing the first candidate question and the second chunk to the first machine learning model, wherein the first machine learning model generates a second output in response;
   comparing the second output to the second chunk and generating a score; and
   in response to the score being above a threshold:
      identifying at least a portion of the second chunk as the answer; and
      associating the answer to the first candidate question for use as the training data.

4. The method of claim 3, wherein the comparing includes:
   determining alignment of strings in the second output to strings in the second chunk, wherein the score is indicative of a percentage of strings in the output that align with the strings in the second chunk.

5. The method of claim 3 further comprising:
   in response to the score being below a threshold:
      employing a second machine learning model for assigning a classification score to the second output;
      based on the classification score, identifying at least a portion of the second chunk as the answer; and
      associating the answer to the first candidate question for use as the training data.

6. The method of claim 1, wherein the source data includes at least one of a text file, image file, sound file, web page, or social media post.

7. The method of claim 1, wherein the identifying includes identifying a visual cue associated with the first chunk.

8. The method of claim 7, wherein the visual cue is at least one of font size, font type, font bold level, or data spacing.

9. The method of claim 1 further comprising:
   identifying a second chunk of the source data, wherein the second chunk contains a second response to the user query different from the first response;
   executing the first machine learning model for generating a prediction of a second candidate question based on the second chunk;
   performing a similarity computation for determining that the second candidate question is similar to the first candidate question; and
   triggering an action in response to the determining.

10. The method of claim 9, wherein the action is selecting one of the first chunk over the second chunk for associating with the first candidate question.

11. The method of claim 9, wherein the action is merging the first chunk and the second chunk for generating a merged chunk, and associating the merged chunk with the first candidate question.

12. The method of claim 1 comprising:
   identifying a change in the source data; and
   retraining the chatbot based on the change in the source data.

13. The method of claim 1 further comprising:
   displaying the first candidate question; and
   receiving a user request for the candidate question.

14. A system for generating a chatbot comprising:
   a processor; and
   a memory, wherein the memory includes instructions that, when executed by the processor, cause the processor to:
      identify source data;
      identify a first chunk of the source data, wherein the first chunk contains a first response to a user query;
      identify an instruction, wherein the instruction includes a description of an output to be generated;
      provide the instruction and the first chunk as inputs to a first machine learning model;
      generate by the first machine learning model, as the output, based on the instruction and the first chunk, a prediction of a first candidate question to be answered by the first chunk;
      determine whether the first candidate question satisfies a criterion; and
      output the first candidate question as training data for training the chatbot in response to determining whether the first candidate question satisfies the criterion.

15. The system of claim 14, wherein the instructions that cause the processor to determine whether the first candidate question satisfies the criterion include instructions that cause the processor to:
- identify a second chunk of the source data, wherein the second chunk includes the first chunk, wherein the second chunk provides additional data as context for the first chunk;
- determine whether an answer to the first candidate question is found in the second chunk.

16. The system of claim 15, wherein the instructions further cause the processor to:
- provide the first candidate question and the second chunk to the first machine learning model, wherein the first machine learning model generates a second output in response;
- compare the second output to the second chunk and generating a score; and
- in response to the score being above a threshold:
  - identify at least a portion of the second chunk as the answer; and
  - associate the answer to the first candidate question for use as the training data.

17. The system of claim 16, wherein the instructions that cause the processor to compare include instructions that cause the processor to:
- determine alignment of strings in the second output to strings in the second chunk, wherein the score is indicative of a percentage of strings in the output that align with the strings in the second chunk.

18. The system of claim 16, wherein the instructions further cause the processor to:
- in response to the score being below a threshold:
  - employ a second machine learning model for assigning a classification score to the second output;
  - based on the classification score, identify at least a portion of the second chunk as the answer; and
  - associate the answer to the first candidate question for use as the training data.

19. The system of claim 14, wherein the source data includes at least one of a text file, image file, sound file, web page, or social media post.

20. The system of claim 14, wherein the instructions that cause the processor to identify include instructions that cause the processor to identify a visual cue associated with the first chunk.

21. The system of claim 14, wherein the instructions further cause the processor to:
- identify a second chunk of the source data, wherein the second chunk contains a second response to the user query;
- execute the first machine learning model for generating a prediction of a second candidate question based on the second chunk;
- determine that the second candidate question is similar to the first candidate question; and
- trigger an action in response to determining that the second candidate question is substantially similar to the first candidate question.

* * * * *